(12) United States Patent
Minard et al.

(10) Patent No.: US 10,640,057 B2
(45) Date of Patent: May 5, 2020

(54) HEAT SHIELD WITH RETENTION FEATURE

(71) Applicant: Lydall, Inc., Manchester, CT (US)

(72) Inventors: Michael Minard, Canton, MI (US); Thomas Cutsinger, Taylorsville, NC (US)

(73) Assignee: Lydall, Inc., Manchester, CT (US)

( * ) Notice: Subject to any disclaimer, the term of this patent is extended or adjusted under 35 U.S.C. 154(b) by 11 days.

(21) Appl. No.: 16/061,602

(22) PCT Filed: Dec. 5, 2016

(86) PCT No.: PCT/US2016/064966
§ 371 (c)(1),
(2) Date: Jun. 12, 2018

(87) PCT Pub. No.: WO2017/116617
PCT Pub. Date: Jul. 6, 2017

(65) Prior Publication Data
US 2018/0370457 A1      Dec. 27, 2018

Related U.S. Application Data

(60) Provisional application No. 62/271,609, filed on Dec. 28, 2015.

(51) Int. Cl.
*F28F 13/00* (2006.01)
*B60R 13/08* (2006.01)
(Continued)

(52) U.S. Cl.
CPC .......... *B60R 13/08* (2013.01); *B60R 13/0876* (2013.01); *F01N 13/102* (2013.01);
(Continued)

(58) Field of Classification Search
CPC ...... F23M 5/04; B60R 13/08; B60R 13/0876; B60R 2013/0807; F01N 13/102; F01N 13/14; F01N 13/1822; F01N 2260/20
(Continued)

(56) References Cited

U.S. PATENT DOCUMENTS 6,085,515 A   7/2000   Walz et al.
6,508,595 B1  1/2003   Chan et al.
(Continued)

FOREIGN PATENT DOCUMENTS

DE   202010013507 U1   3/2011
DE   202011001963 U1   3/2012
(Continued)

OTHER PUBLICATIONS

European Patent Office Examination Report of Application No. 16816821.9, which is in the same family of U.S. Appl. No. 16/061,602, dated Apr. 17, 2019, 4 pgs.
(Continued)

*Primary Examiner* — Davis D Hwu
(74) *Attorney, Agent, or Firm* — Moyles IP, LLC (57) ABSTRACT

According to an aspect, the present embodiments may be associated with a heat shield including a retention feature or member. In an embodiment, the retention member is integrated with the heat shield body and includes a trilobal shaped aperture formed therein. The trilobal shaped aperture is adapted and configured to receive and temporarily retain a fastener. Thus, the heat shield is capable of at least being temporarily held in place prior to the use of permanent installation techniques.

20 Claims, 7 Drawing Sheets

(51) Int. Cl.
*F01N 13/10* (2010.01)
*F01N 13/14* (2010.01)
*F01N 13/18* (2010.01)
*F02B 77/11* (2006.01)

(52) U.S. Cl.
CPC .......... *F01N 13/14* (2013.01); *F01N 13/1811* (2013.01); *F01N 13/1822* (2013.01); *F01N 13/1855* (2013.01); *F02B 77/11* (2013.01); *B60R 2013/0807* (2013.01); *F01N 2260/20* (2013.01)

(58) Field of Classification Search
USPC ........................................................ 165/135
See application file for complete search history.

(56) References Cited

U.S. PATENT DOCUMENTS

| | | | |
|---|---|---|---|
| 7,775,047 B2 | 8/2010 | Fish et al. |
| 8,251,039 B2 | 8/2012 | Speer |
| 8,568,073 B2 | 10/2013 | Eberle et al. |
| 8,800,292 B2 | 8/2014 | Bottcher et al. |
| 8,840,375 B2 | 9/2014 | Virkler |
| 8,844,668 B2 | 9/2014 | Oshima et al. |
| 8,887,687 B2 | 11/2014 | Upton et al. |
| 8,943,835 B2 | 2/2015 | Corsmeier et al. |
| 2011/0318531 A1 | 12/2011 | Krusch |
| 2012/0222283 A1 | 9/2012 | Upton et al. |

FOREIGN PATENT DOCUMENTS

| | | |
|---|---|---|
| EP | 0453139 A1 | 10/1991 |
| EP | 2070771 A1 | 6/2009 |
| FR | 2781536 A1 | 1/2001 |
| KR | 20140075179 A | 6/2014 |
| WO | WO-2014207207 A1 | 12/2014 |

OTHER PUBLICATIONS

Car survey.org, 2012 Nissan Versa Reviews, Aug. 2, 2014, 4 pgs., http://www.carsurvey.org/reviews/nissan/versa/2012/.

European Patent Office—ISA, International Search Report and Written Opinion of International App. No. PCT/US2016/064966, dated Mar. 30, 2017, 12 pgs.

European Patent Office Examination Report of Application No. 16816821.9, which is in the same family of U.S. Appl. No. 16/061,602, dated Dec. 18, 2019, 4 pgs.

HEAT SHIELD WITH RETENTION FEATURE

CROSS-REFERENCE TO RELATED APPLICATIONS

This application claims priority to PCT Application No. PCT/US2016/064966 filed Dec. 5, 2016, which claims the benefit of U.S. Provisional Application No. 62/271,609 filed Dec. 28, 2015, which is incorporated herein by reference in its entirety.

FIELD

A device and a method for providing a heat shield with a retention feature that provides temporary retention and facilitates ease of assembly/mounting without the use of fasteners is generally described.

BACKGROUND

Thermal and/or thermal-acoustical shields are used in a wide variety of applications, among which are shielding in space crafts, automobiles, home appliances, electronic components, industrial engines, boiler plants and the like, and are commonly referred to as heat shields, acoustical panels, thermal barriers, vibrational barriers, acoustical barriers, insulating shields, and the like. As used herein, such terms are considered interchangeable. Such shields may be used, for example, between an object to be protected, e.g., thermally shielded, for example, the outer dash of an automobile, and a high temperature exhaust component such as a catalytic converter or manifold. Additionally, such shields may be designed to provide acoustical shielding and/or vibration isolation.

Known heat shields are often designed for use in vehicles such as automobiles and, as such, are typically subjected/exposed to the harsh under hood environment of vehicles. In order to be effective, heat shields are utilized in those areas that are typically exposed to a variety of liquids, such as engine oil, brake fluid, transmission fluid, antifreeze, and the like, and those areas are subjected to high and low temperatures. While some heat shields can be made of thermoplastics, because exhaust gas temperatures in an internal combustion engine approach around 1050° C., heat shields are oftentimes made of heat resistant materials such as ceramic, which are heavy. In addition, these shields are oftentimes mounted under the vehicle body, facilitated with the use of threaded rods and/or fasteners. The bodies of such heat shields are often provided with circular openings for receiving the threaded rods and/or fasteners. Therefore, during installation of such shields, an installer is often tasked with using both hands to hold the heat shield in place, and in some situations, more than one installer is required for proper placement and mounting/installation of the heat shield. This type of installation, typically occurring on, for instance, an automotive assembly line, is often costly because of the number of bolts required, as well as the time and labor needed to affix these fasteners. If more than one assembly worker is required to install a single heat shield, the cost can be high, and in the cases where heat shields are being installed in multiple vehicles, it is particularly time-consuming and cumbersome.

Figure 1:
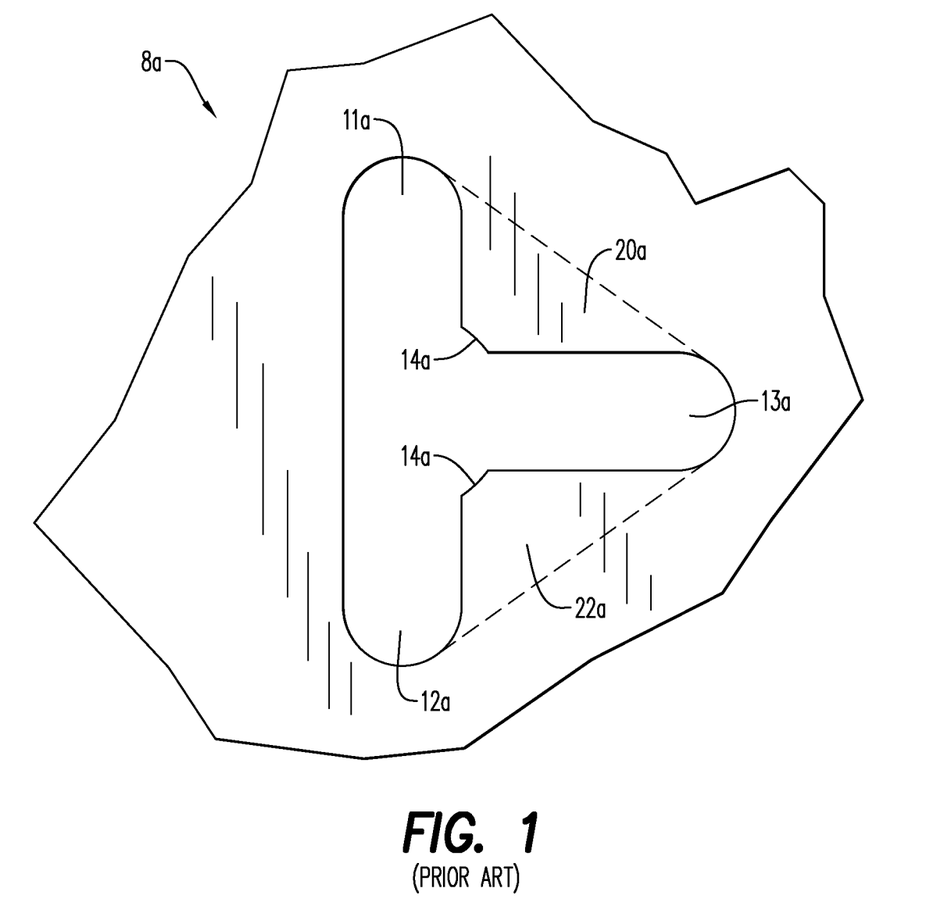
FIG. 1 illustrates a top view of a cooperating means of a prior art heat shield.

FIG. 1 depicts a prior art cooperating means 8a formed in a heat shield (not shown) for mounting the heat shield to, for instance, threaded rods extending from a vehicle, which fails to provide sufficient retention strength. The cooperating means 8a has three slots 11a, 12a, 13a shaped to form a sideways capitalized "T". The three slots 11a, 12a, 13a each radiate from a central passageway/recess 14a. One slot 11a is separated by another slot 12a by 180°, while slot 13a is separated from each of slots 11a and 12a by 90° angles. The cooperating means 8a includes two retention tabs 20a, 22a formed between the two slots separated by the 90° angles. A disadvantage of this cooperating means 8a is that if a threaded rod is inserted therein, and put under stress, the threaded rod will tend to press/push (or have an affinity to) against the two retention tabs 20a, 22a. The two tabs 20a, 22a are oftentimes insufficient to retain the threaded rod and tend to bend substantially, and in some circumstances break off completely, which leads to the untimely and unwanted withdrawal/removal of any such threaded rod inserted therein. As a result, the cooperating means 8A is unable to provide sufficient retention of the heat shield, and the heat shield will become dislodged.

Figure 2:
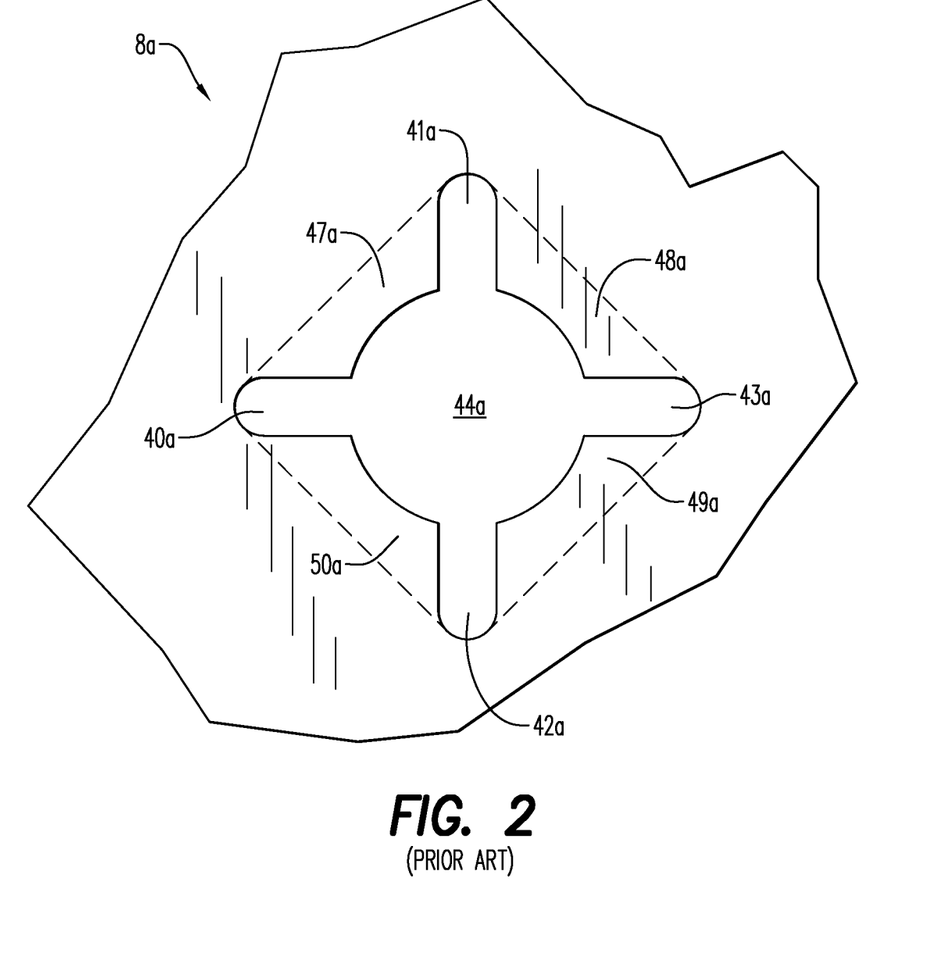
FIG. 2 illustrates a top view of a cooperating means of a prior art heat shield.

FIG. 2 is a stylized drawing of another prior art device in which cooperating means 8a is formed in a heat shield (not shown). The cooperating means 8a has four slots 40a, 41a, 42a, 43a radiating from a central passageway/recess 44a. As shown, the diameter of the central passageway/recess 44a appears to be approximately twice the size of the length of each of the slots 40a, 41a, 42a, 43a. Each slot 40a, 41a, 42a, 43a is equidistantly separated from an adjacent slot by a 90° angle, with a tab 47a, 48a, 49a, 50a being positioned between adjacent slots. For example, slot 40a is separated from slots 41a on one side and 42a on the opposite side by a 90° angle, with tab 47a being positioned between slots 41a and 40a, and tab 50a being positioned between slots 40a and 42a. As shown, the size of each tab 47a, 48a, 49a, 50a is small relative to the size of the central passageway/recess 44a, which is a function of the short length of each slot 40a, 41a, 42a, 43a. A disadvantage with this arrangement is that the overall area of each tab 47a, 48a, 49a, 50a is quite small, therefore, the cooperating means 8a may be unable to provide sufficient retention. Failure of even one of the tabs 47a, 48a, 49a, 50a to perform properly would likely result in failure of the cooperating means 8a altogether. Moreover, in situations where the cooperating means 8a is being used for permanent retention, the heat shield may become easily dislodged, resulting in irreparable and/or costly damage to the heat shield.

Various techniques have been employed for designing and/or forming heat shields that help to ease the process of aligning, mounting and/or attaching heat shields in a desired position. One such technique involves the use of a clip-snap combination, including clips and/or spring clips, which enable the heat shield to be aligned and/or inserted into place to facilitate attachment of the heat shield in the desired position. However, these snap-clip combinations also require the use of additional fastening devices, such as fasteners that can increase installation and/or maintenance costs. In addition, the use of these clips tends to be cumbersome for installers, because the clips retain the heat shield in a manner that often restricts movement in a unidirectional movement only, thereby making efforts to reposition the heat shield difficult.

Another technique employs the use of retention tabs, which clamp or hold the heat shield in place. A disadvantage with this technique is that it requires other attachment features, such as spring arms and snap-lock connectors, in order to be effective. In addition it also restricts movement that is often needed to reposition the heat shield to a desired location.

Other techniques involve using screw connections, where screws are placed in recesses placed on the lateral edges of a heat shield body. A common disadvantage with this assembly is that is poses a handling problem for installers. When installing a heat shield with two or more screws, additional fixing means, such as bonding or adhesive tape is required to help hold the heat shield in the desired position. In addition, overhead installation is often challenging because the screws often tilt due to the use of bonding or adhesive tape, and cannot be threaded into the recesses provided for receiving said screws.

The aforementioned solutions are costly, and do not facilitate efficient installation.

In view of the disadvantages associated with currently available methods and devices for heat shield retention, there is a need for a device that, with one installer and/or with a single hand, temporarily retains and/or holds a heat shield in place prior to permanent installation in a manner that simplifies and reduces costs associated with production, installation, maintenance and/or removal of heat shield assemblies.

BRIEF DESCRIPTION

According to an aspect, the present embodiments may be associated with a heat shield including a retention member. In an embodiment, the retention member is integrated with the heat shield body and includes a trilobal shaped aperture. The retention member is adapted and configured to receive and at least temporarily retain a fastener. Thus, the heat shield is capable of at least being temporarily held in place prior to or as a substitute for the use of permanent installation techniques.

BRIEF DESCRIPTION OF THE FIGURES

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

DETAILED DESCRIPTION

Reference will now be made in detail to various embodiments. Each example is provided by way of explanation, and is not meant as a limitation and does not constitute a definition of all possible embodiments.

Embodiments of the disclosure relate generally to devices and methods for at least temporarily retaining a heat shield in place during assembly and prior to permanent assembly, as well as a device for installing and aligning a heat shield in a desired position. Such devices find particular utility in vehicle and appliance compartments. For example, the heat shields described herein may include moldable, self-supporting, insulating materials, including one or more metallic layers, commonly used in conjunction with an inner nonwoven layer, wherein the heat shield may provide thermal, vibrational and/or acoustical insulation, and limit airflow and liquid flow. The heat shields contemplated include at least a heat shield body and at least one retention member having a trilobal shaped aperture. According to an aspect, the heat shield includes the retention member integrated with the heat shield. The retention member is adapted and configured to receive and temporarily retain a fastener. Thus, the heat shield is capable of being temporarily held in place prior to or as a substitute for the use of permanent installation techniques.

According to an aspect, the retention member is capable of aligning the heat shield in a desired position and at least temporarily holding or retaining the heat shield in that desired position until techniques for permanent installment are taken, if any. Permanent installation techniques may include those discussed hereinabove, adhesives, push pins, threaded rods and/or fasteners, and other techniques designed to permanently hold a heat shield in place.

For purposes of illustrating features of the embodiments, a simple example will now be introduced and referenced throughout the disclosure. Those skilled in the art will recognize that this example is illustrative and not limiting and is provided purely for explanatory purposes.

Figure 3:
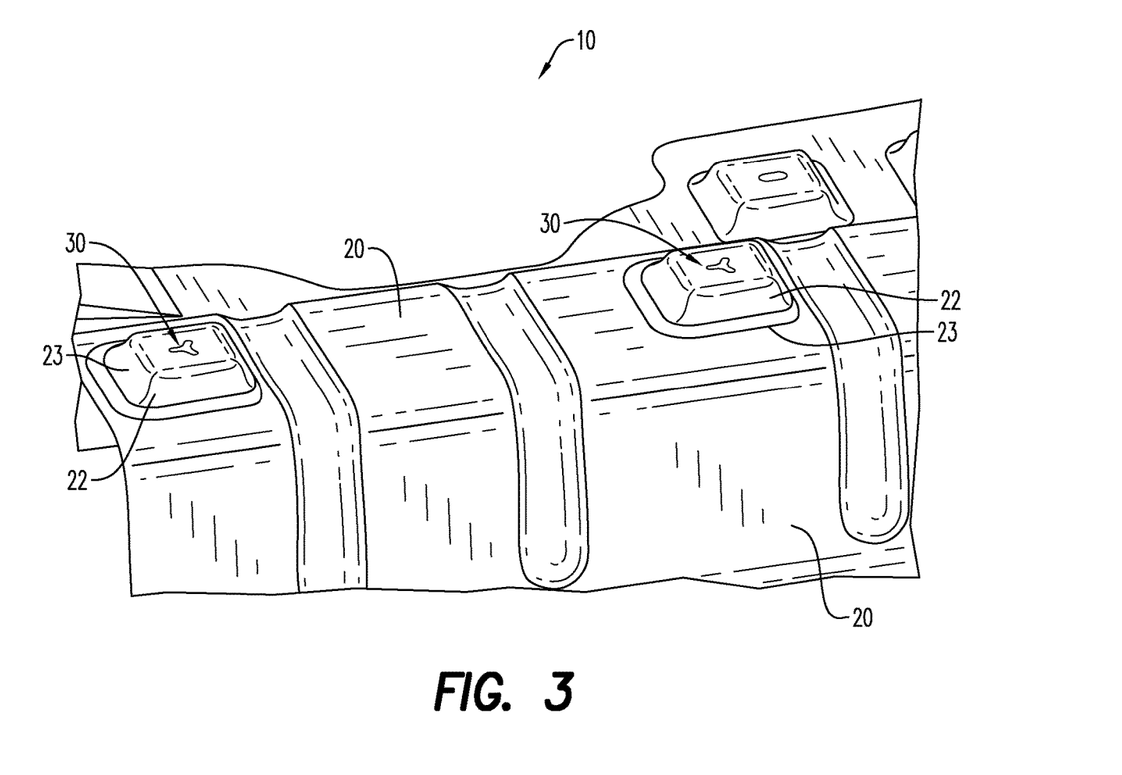
FIG. 3 is a perspective view of a heat shield, showing retention members in the heat shield body according to an embodiment.

Referring now to the drawings, in the illustrative example seen in FIG. 3, a heat shield 10 according to an embodiment is shown. The heat shield 10 includes a heat shield body 20 and at least one retention member 30 integrated with or otherwise arranged on or in the heat shield body 20. In an embodiment, the retention member 30 is integrated with and/or positioned in a plate 22 positioned on the heat shield body 20, while in alternative embodiments, the retention member 30 is positioned directly on the heat shield body 20. In an embodiment, the retention member 30 is positioned centrally on the heat shield body 20. By "central", what is meant is that the retention member 30 is not positioned along a periphery of the heat shield body 20. In some embodiments, the heat shield body 20 is made of one or more layers of metallic or thermoplastic materials including, but not limited to, aluminum, stainless steel, steel, thermoplastic, nonwoven, or combinations thereof. The heat shield body 20 may be used in conjunction with an inner nonwoven layer, wherein the heat shield 10 may provide thermal, vibrational and/or acoustical insulation.

According to an aspect, the heat shield body 20 may include one or more plates 22 formed therein. While FIG. 3 shows the heat shield body 20 having two plates 22 located on it, it is to be understood that in some embodiments, there may be less than two, or more than two plates, such as 3, 4, 5, 6 and so forth. As described herein, the retention member 30 may be formed in the plate 22, while in an alternative embodiment, the retention member 30 is formed directly in the heat shield body 20. In embodiments where the heat shield body 20 has the plate 22 formed therein, the plate 22 may further aid an installer in the alignment of the heat shield 10 in a desired position.

In an embodiment, the plate 22 is centrally located on the heat shield body 20. Alternatively, the one or more of the plates 22 may be positioned at locations other than centrally located on the heat shield body 20. In some embodiments, the plate 22 is positioned at any location on the heat shield body 20 where there is a desire to place a retention member 30. In an embodiment, the plate 22 is co-extensive with the heat shield body 20, such that the plate 22 and the heat shield body 20 are arranged in the same plane. In some embodiments, the plate 22 is raised relative to the heat shield body 20. Generally, when raised, the plate 22 operates as a platform that functions as an air grab or locating means that helps to guide, align and/or position the heat shield 10 towards an underbody portion of, for example, a vehicle such as an automobile, having a stem, rod, protrusion or fastener 45 (see, for instance, FIGS. 7A and 7B) positioned thereon and extending therefrom. In some configurations, the plate 22 may be formed integrally with the heat shield body 20. In an embodiment, the plate 22 is detachable from the heat shield body 20. Thus, it is possible to provide an embodiment in which the plate 22 is made of a material other than the material used to make the heat shield body 20. For example, in embodiments where the heat shield body is made of stainless steel, the plate 22 may be made of steel, aluminum or thermoplastic, nonwoven or any combinations thereof.

The retention member 30 is configured to maintain the heat shield body 20 in at least a semi-stationary position prior to permanently fastening the heat shield 10. Thus, in an embodiment, the retention member 30 is capable of maintaining the heat shield body 20 in a semi-stationary position prior to fastening of the heat shield 10. In some embodiments, the retention member 30 is configured as a trilobal shaped aperture 40 (as described in further detail hereinbelow with reference to FIGS. 4, 5 and 6) having three resilient tabs 46a, 46b, 46c at least partially surrounding a central opening 42. The trilobal shaped aperture 40 is adapted and configured to receive and at least temporarily retain the fastener 45 (as described in further detail hereinbelow with reference to FIGS. 7A and 7B).

Figure 4:
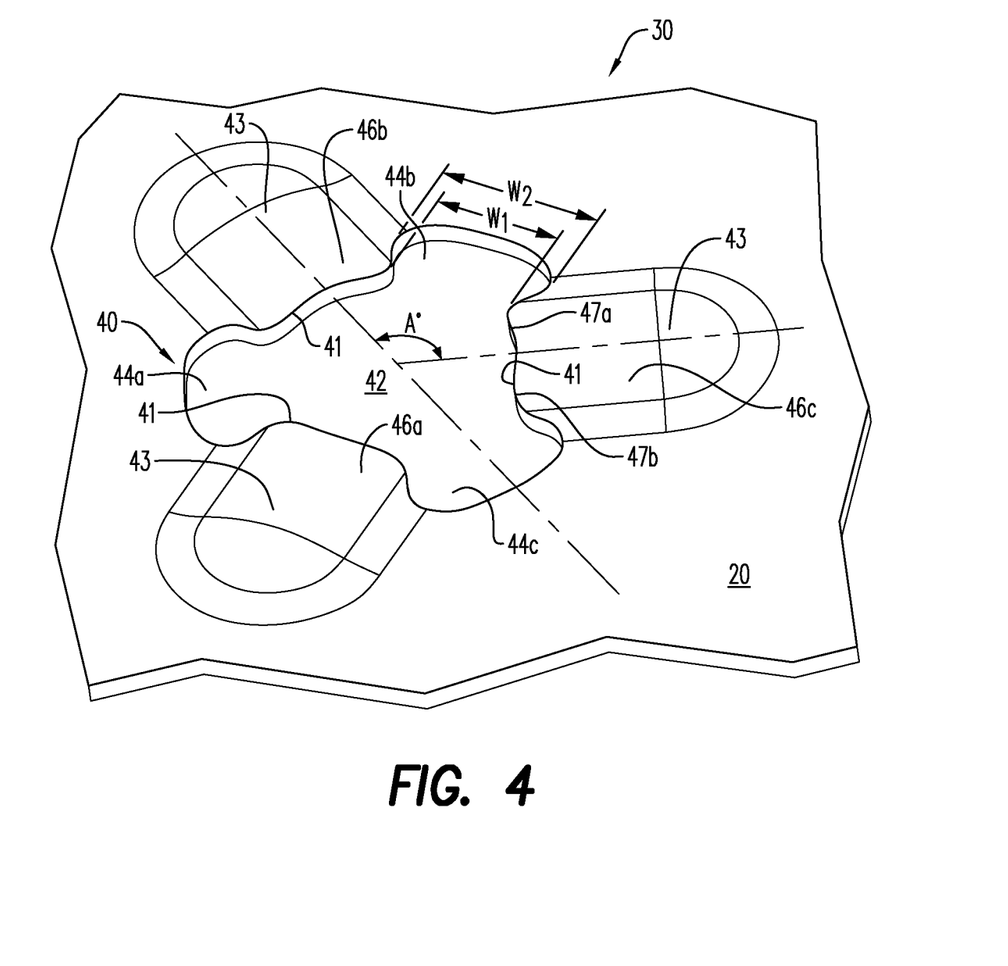
FIG. 4 is a top view of a retention member having resilient tabs, according to an embodiment.
Figure 5:
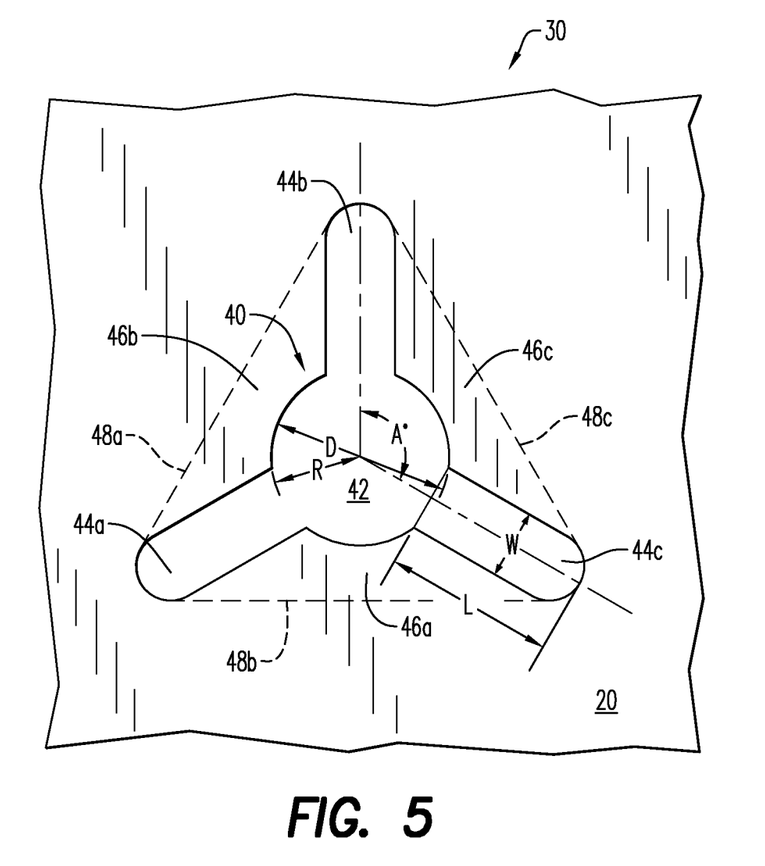
FIG. 5 is a top view of a retention member having a pronounced central opening, according to an embodiment.
Figure 6:
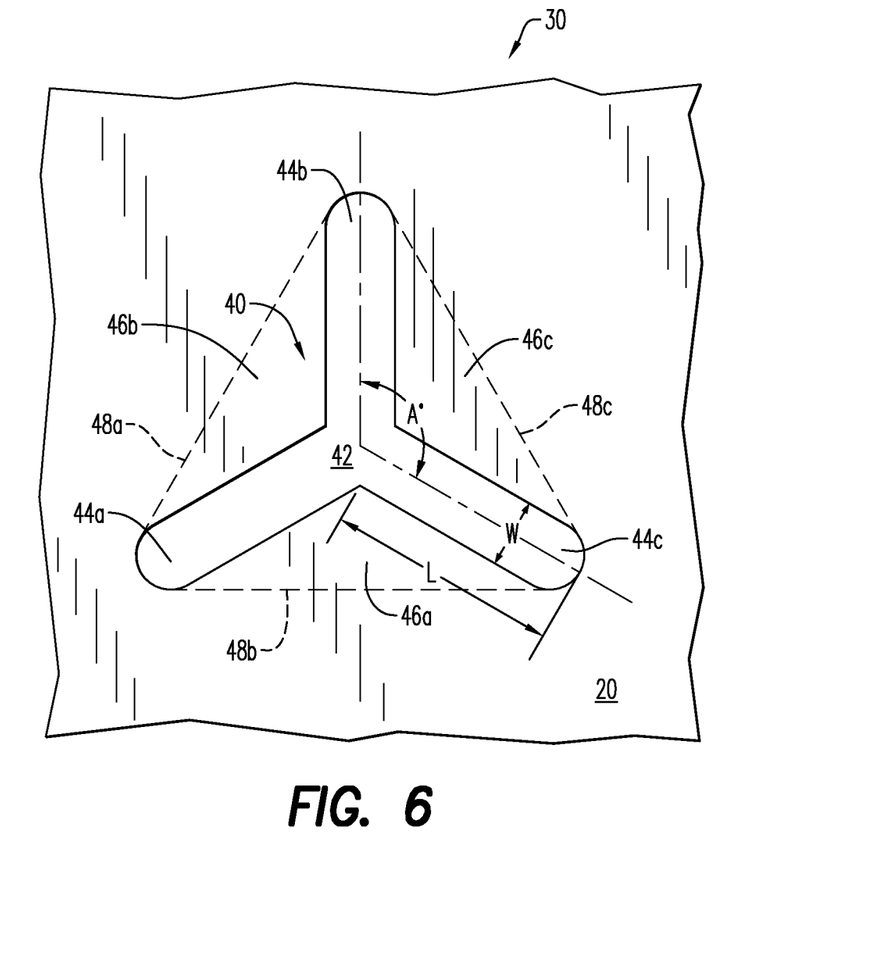
FIG. 6 is a top view of another retention member without a pronounced central opening, according to an embodiment.

Now referring to FIGS. 4, 5 and 6, and according to an aspect, the retention member 30 includes the trilobal shaped aperture 40 formed therein. The trilobal shaped aperture 40 includes three channels 44a, 44b, 44c extending from a central opening 42 and forms resilient tabs 46a, 46b, 46c between each of the channels 44a, 44b, 44c. In an embodiment, the central opening 42 in combination with the resilient tabs 46a, 46b, 46c creates an aperture arrangement that allows for an interference-fit with the fastener 45. (See, for instance, FIGS. 7A and 7B.) Each of the channels 44a, 44b, 44c extends radially from the central opening 42. In an embodiment, each of the channels 44a, 44b, 44c is equidistantly spaced from each other. In some cases, the channels 44a, 44b, 44c may be positioned away from each adjacent channel at an angle A° greater than 90°, but less than 180°. In other words, considering an imaginary centerline extending through the center of each channel 44a, 44b, 44c, the angle A° between a first channel and a second or adjacent channel may be, for instance, 120°. It is contemplated that other angular arrangements might be used, so long as an aperture arrangement, created by the interaction between the channels 44a, 44b, 44c, central opening 42 and resilient tabs 46a, 46b, 46c, is created that provides an interference-fit with the fastener 45 that at least temporarily holds the heat shield 10 in place until permanent retention means is employed.

As depicted in FIG. 4, each of the channels 44a, 44b, 44c extending from the central opening 42 may have a same length L. In some embodiments, the length L of each channel 44a, 44b, 44c may differ from the length L of an adjacent channel (not shown). According to an aspect, each of the channels may have an inner width $W_2$ and an outer width $W_1$. As illustrated in FIG. 4, the inner width $W_2$ may be larger than the outer width $W_1$, creating a formation commonly termed as "Mickey Mouse" ears. In this embodiment, the overall width of each of the channels increases as the channel extends further away from the central opening 42. In some embodiments and as illustrated in FIGS. 5 and 6, the width W may be substantially the same along a substantial portion of the length L.

According to an aspect, the length L of each of the channels 44a, 44b, 44c may be greater than the width W, that is, the inner width $W_2$ or the outer width $W_1$ of each of the channels 44a, 44b, 44c. The length L of each of the channels may be less than at least one of the width W, the inner width $W_2$ and the outer width $W_1$. In some embodiments, the inner width $W_2$ and/or the outer width $W_1$ of at least one channel 44a, 44b, 44c is greater than the inner width $W_2$ and/or the outer width $W_1$ of an adjacent channel. In some embodiments and as illustrated in FIG. 4, the inner and outer widths $W_2$, $W_1$ do not vary as between each of the channels 44a, 44b, 44c, and the length L of each of the channels 44a, 44b, 44c is the same. The length L of at least one of the channels 44a, 44b, 44c may be about 2.5 mm to about 10 mm. The inner and outer widths $W_2$, $W_1$ of each of the channels 44a, 44b, 44c may be about 0.5 mm to about 2.5 mm. In any event, the length L and inner and outer widths $W_2$, $W_1$ of each of the channels 44a, 44b, 44c is selected based on the ability to stably hold the heat shield 10 in place until permanent installment and/or retention measures are employed, if necessary. In other words, according to some embodiments, one of more retention feature(s) or member(s) 30 is capable of permanently retaining the heat shield 10 without the need for permanent fasteners.

As shown in FIGS. 4 and 5, the shape of the central opening 42 of the trilobal shaped aperture 40 may be circular, however, it is to be understood that the shape of the central opening 42 may be any other desired shape. As illustrated in FIG. 5 and in an embodiment, when the central opening 42 is a circular shape, it has a diameter D and a radius R. The diameter D may be the same size as a length L of at least one of the channels 44a, 44b, 44c. In some embodiments, the diameter D is a different size than the length L of the channels 44a, 44b, 44c. The diameter D of the central opening 42 may be designed such that the trilobal shaped aperture 40 is capable of providing the desired stable and temporary retention of the heat shield body 20. As illustrated in FIG. 6, in some embodiments, the central opening 42 is not of a circular shape, but is a central point where each of the channels 44a, 44b, 44c meet and/or intersect.

As shown in FIGS. 4, 5 and 6 and in an embodiment, the retention member 30 of the heat shield 10 may include at least one resilient tab 46a, 46b, 46c extending between adjacent channels 44a, 44b, 44c. According to an aspect, the resilient tabs 46a, 46b, 46c are separated by a channel 44a, 44b, 44c on each side. For example, and as depicted in FIGS. 4, 5 and 6, a resilient tab 46a is positioned between adjacent channel 44a and adjacent channel 44c. In an embodiment, the resilient tabs 46a, 46b, 46c at least partially surround the central opening 42 and are configured to move between a rest position and a deformed position.

With specific reference to FIG. 4 and in an embodiment, each of the three resilient tabs 46a, 46b, 46c includes a scalloped edge 41. According to an aspect, the scalloped edge 41 includes two protuberances 47a, 47b that each extend towards the central opening 42. The protuberances 47a, 47b of the resilient tabs 46a, 46b, 46c help facilitate an interference-fit with the fastener 45. In an embodiment, each of the resilient tabs 46a, 46b, 46c include a raised portion 43 centrally located thereon. In an embodiment, the raised portion 43 is positioned between protuberances 47a, 47b. As illustrated in FIG. 4, the arrangement of the raised portion extends along a length of the resilient tab and is positioned between the protuberances 47a, 47b thereby creating the scalloped edge 41 of each of the tabs 46a, 46b, 46c, such that the scalloped edge 41 appears to have a plurality of raised crests and valleys. The raised portion 43 may be formed by being crimped and/or indented. According to an aspect, the raised portion 43 is shaped such that it has a concavity (not shown). The concavity may have a depth of about 0.25 mm to about 2.00 mm. In embodiments having the scalloped edges 41, the retention member prevents the heat shield from falling out of place and helps facilitate retention of a fastener 45.

As shown in FIGS. 5 and 6, there are three resilient tabs 46a, 46b, 46c, each being positioned between at least two of the three channels 44a, 44b, 44c. The resilient tabs 46a, 46b, 46c may form a substantially triangular shape in which a tip of the triangle generally conforms to the shape of the central opening 42 and bendable base portions 48a, 48b, 48c form the foundation of the substantially triangular shape. The bendable base portions 48a, 48b, 48c, shown as broken lines in FIGS. 5 and 6, extend from the heat shield body 20. The bendable base portions 48a, 48b, 48c may flex and deform upon the introduction of a fastener 45 (see, for example, FIGS. 7A and 7B) into the trilobal shaped aperture 40. In other words, the resilient tabs 46a, 46b, 46c can be deflected and/or deformed to move between the rest/deformed position when the fastener 45 is introduced/removed within the trilobal shaped aperture 40, without experiencing breakage. According to an aspect, the resilient tabs 46a, 46b, 46 c are capable of returning to their original configuration upon removal of the fastener 45. This is a function of at least the material selected to make the retention member 30, and the arrangement of the channels 44 which create at least two sides of the resilient tabs 46a, 46b, 46c.

Figure 7A:
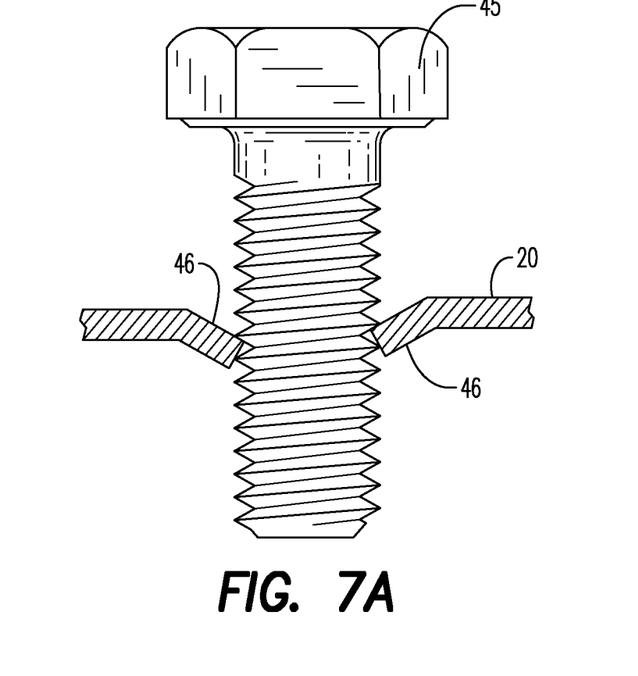
FIG. 7A is a side cross-sectional view of a retention member according to an embodiment, illustrating a threaded fastener/rod being retained therein.
Figure 7B:
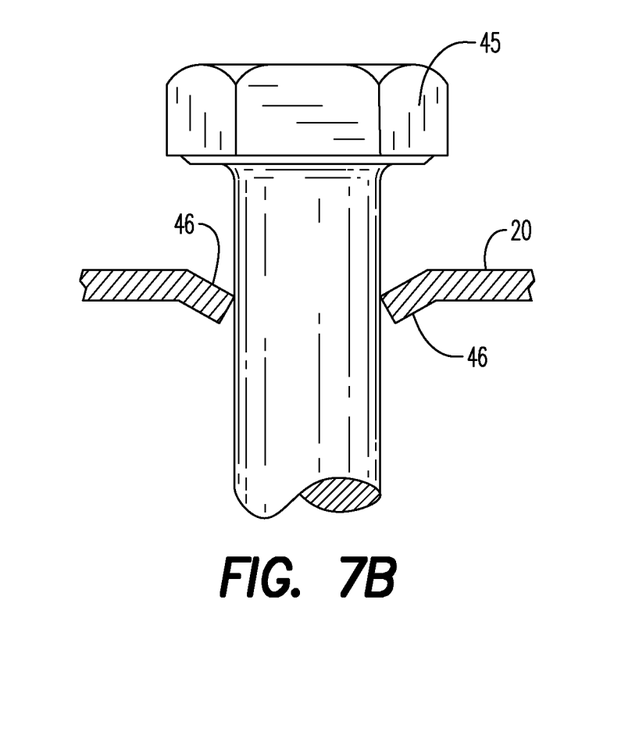
FIG. 7B is a side cross-sectional view of a retention member according to an embodiment, illustrating a non-threaded fastener/rod being retained therein.

As seen in FIGS. 7A and 7B, when the fastener 45 is inserted within the retention member 30, specifically into the central opening 42, the resilient tabs 46a, 46b, 46c provide frictional force that is capable of at least temporarily retaining the fastener 45. The heat shield body 20 retains its structure and/or shape, while only the resilient tabs 46a, 46b, 46c deform to allow the introduction of the fastener 45 into the central opening 42. The fasteners 45 may be of a cylindrical shape and include a cylindrical shank. In some embodiments, the fastener 45 includes a head attached at one end of the cylindrical shank. As illustrated in FIG. 7A, in some embodiments, the fastener 45 is threaded, such as a threaded bolt, including a machine screw, set screw, carriage bolt, hanger bolt, and the like. The ends of the resilient tabs 46 facing the central opening 42 frictionally engage with the threaded surface of the fastener 45. As illustrated in FIG. 7B, and in some embodiments, the fastener 45 is non-threaded. The fastener 45 may be a non-threaded protrusion, such as a cylindrical rod. The ends of the resilient tabs 46a, 46b, 46c facing the central opening 42 frictionally engage with the non-threaded surface of the fastener 45.

The heat shield components illustrated are not limited to the specific embodiments described herein, but rather, features illustrated or described as part of one embodiment can be used on or in conjunction with other embodiments to yield yet a further embodiment. It is intended that the heat shield include such modifications and variations.

While the heat shield has been described with reference to specific embodiments, it will be understood by those skilled in the art that various changes may be made and equivalents may be substituted for elements thereof without departing from the scope contemplated. In addition, many modifications may be made to adapt a particular situation or material to the teachings found herein without departing from the essential scope thereof.

In this specification and the claims that follow, reference will be made to a number of terms that have the following meanings. The singular forms "a," "an" and "the" include plural referents unless the context clearly dictates otherwise. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "inner," "outer," etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

Advances in science and technology may make equivalents and substitutions possible that are not now contemplated by reason of the imprecision of language; these variations should be covered by the appended claims. This written description uses examples to disclose the heat shield, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A heat shield, comprising:
    a heat shield body; and
    at least one retention member integrated with the heat shield body, wherein
    the retention member is configured as a trilobal shaped aperture with three resilient tabs at least partially surrounding a central opening, each of the three resilient tabs comprising a scalloped edge including two protuberances and a raised portion positioned between the two protuberances, the retention member being adapted and configured to receive and temporarily retain a fastener, and the three resilient tabs being configured to move between a rest position and a deformed position.

2. The heat shield of claim 1, wherein the central opening in combination with the resilient tabs creates an aperture arrangement that allows for an interference-fit with the fastener.

3. The heat shield of claim 1, wherein the retention member is configured such that the retention of the heat shield body maintains the heat shield body in a semi-stationary position prior to fastening the heat shield.

4. The heat shield of claim 1, wherein the heat shield body is made of one or more layers of material that is aluminum, stainless steel, steel, thermoplastic, nonwoven or combinations thereof.

5. The heat shield of claim 1, wherein the retention member is configured such that the retention of the heat shield body maintains the heat shield body in a semi-stationary position prior to permanently fastening the heat shield to a vehicle.

6. The heat shield of claim 2, wherein the retention member is configured such that the retention of the heat shield body maintains the heat shield body in a semi-stationary position prior to fastening the heat shield to an underbody portion of a vehicle.

7. The heat shield of claim 1, wherein the raised portion extends along a length of the resilient tab.

8. The heat shield of claim 1, further comprising three channels extending radially from the central opening.

9. The heat shield of claim 8, wherein each of the three channels has an inner width and an outer width, the inner width being larger than the outer width.

10. The heat shield of claim 8, wherein a length of each of the three channels is greater than a width of each of the three channels.

11. The heat shield of claim 8, wherein a length of at least one of the three channels is about 2.5 mm to about 10 mm.

12. The heat shield of claim 1, further comprising:
    a plate, wherein the retention member is formed in the plate.

13. The heat shield of claim 12, wherein the plate is centrally located on the heat shield body.

14. The heat shield of claim 12, wherein the plate is coextensive with respect to the heat shield body such that the plate and the heat shield body are arranged in the same plane.

15. The heat shield of claim 12, wherein the plate is raised with respect to the heat shield body.

16. The heat shield of claim 15, wherein
    the fastener is arranged on an underbody portion of a vehicle, and
    the plate is configured to guide, align and position the retention member towards the fastener.

17. The heat shield of claim 12, wherein the plate is detachable from the heat shield body.

18. The heat shield of claim 12, wherein the plate is configured to align the heat shield body, such that the retention member receives the fastener.

19. The heat shield of claim 1, wherein the heat shield body comprises metallic layers.

20. The heat shield of claim 19, wherein the heat shield body comprises an inner nonwoven layer.

* * * * *